US010817761B2

United States Patent
Ohhashi

(10) Patent No.: US 10,817,761 B2
(45) Date of Patent: Oct. 27, 2020

(54) PRINTING APPARATUS AND COMPUTER-READABLE STORAGE MEDIUM

(71) Applicant: BROTHER KOGYO KABUSHIKI KAISHA, Nagoya-shi, Aichi (JP)

(72) Inventor: Masashi Ohhashi, Kasugai (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/562,532

(22) Filed: Sep. 6, 2019

(65) Prior Publication Data
US 2020/0104660 A1   Apr. 2, 2020

(30) Foreign Application Priority Data

Sep. 28, 2018   (JP) .................................. 2018-184504

(51) Int. Cl.
*G06K 15/02* (2006.01)
*H04N 1/387* (2006.01)

(52) U.S. Cl.
CPC ..... *G06K 15/1843* (2013.01); *G06K 15/1813* (2013.01); *G06K 15/1836* (2013.01); *G06K 15/1861* (2013.01); *H04N 1/3877* (2013.01)

(58) Field of Classification Search
None
See application file for complete search history.

(56) References Cited

U.S. PATENT DOCUMENTS

| | | | | |
|---|---|---|---|---|
| 6,763,122 B1* | 7/2004 | Rodriguez | ............ | G06T 1/0028 358/3.28 |
| 7,450,263 B1* | 11/2008 | Brothers | ............... | H04N 1/3877 358/1.2 |
| 8,705,087 B2* | 4/2014 | Tao | ......................... | G03G 15/50 358/1.12 |
| 2003/0158608 A1* | 8/2003 | Ishikawa | ................... | G06T 1/20 700/2 |
| 2010/0245877 A1* | 9/2010 | Wei | ..................... | H04N 1/00212 358/1.13 |

(Continued)

FOREIGN PATENT DOCUMENTS

| | | |
|---|---|---|
| JP | 2001-287413 A | 10/2001 |
| JP | 2002-203236 A | 7/2002 |

(Continued)

*Primary Examiner* — Miya J Williams
(74) *Attorney, Agent, or Firm* — Scully, Scott, Murphy & Presser, PC

(57) ABSTRACT

A printing apparatus, including a printing device, a communication interface, a memory, and a controller, is provided. In a case where the controller determines that an image in image data is to be rotated and that a predetermined condition is satisfied, the controller conducts rotation of the image in the image data concurrently with rasterization of the image data and stores raster data including the rotated image in the memory. In a case where the controller determines that the image in the image data is to be rotated and that the predetermined condition is not satisfied, the controller conducts rasterization of the image data without rotating the image in the image data, and rotates a raster image in the raster data stored in the memory and generates the print data from the raster data including the rotated raster image.

9 Claims, 9 Drawing Sheets

(56) References Cited

U.S. PATENT DOCUMENTS

2012/0154865 A1* 6/2012 Hosoda .................. B41J 11/008
  358/1.15
2015/0220820 A1 8/2015 Kaneda
2019/0347055 A1* 11/2019 Murata ................. G06F 3/1263

FOREIGN PATENT DOCUMENTS

JP 2009-042988 A 2/2009
JP 2015-145069 A 8/2015

* cited by examiner

| Binary | Command Name |
|---|---|
| 41 | % BeginSession |
| C0 00 F8 88 | %   SourceType_UB(0) |
| C0 01 F8 82 | %   DataOrg_UB(1) |
| 48 | % OpenDataSource |
| C0 01 F8 26 | %   MediaSource_UB(1) |
| C0 00 F8 34 | %   SimplexPageMode_UB(0)  ~72 |
| C0 00 F8 28 | %   Orientation_UB(0) |
| C8 C0 02 41 | %   MediaSize_UB(array[2]:65 52) |
| 34 F8 25 | %  ~73 |
| 43 | % BeginPage  ~71 |

FIG. 6

| Text String | Command Name |
|---|---|
| <ESC>E | Printer Reset |
| <ESC>*t600R | Raster Graphics Resolution |
| <ESC>&u600D | Unit of Measure |
| <ESC>*r0F | Raster Graphics Presentation Mode |
| <ESC>&l00 | Logical Page Orientation   ~81 |
| <ESC>&l26A | Page Size  ~82 |
| <ESC>&l7H | Paper Source |
| <ESC>&l0S | Simplex/Duplex Print |
| <ESC>&l8c1E | VMI/Top Margin |
| <ESC>*p0x0Y | Horizontal/Vertical Cursor Positioning |
| <ESC>*c0t5611x8178Y | |
| <ESC>*b0M | Set Compression Method |
| <ESC>&b1M | Monochrome Print Mode |
| <ESC>&l1X | Number of Copies |
| <ESC>*p0Y | Vertical Cursor Positioning |
| <ESC>*v0o0T | |
| <ESC>*r1A | Start Raster Graphics  ~83 |
| <ESC>*b2M | Set Compression Method |

FIG. 7

# PRINTING APPARATUS AND COMPUTER-READABLE STORAGE MEDIUM

CROSS REFERENCE TO RELATED APPLICATION

This application claims priority from Japanese Patent Application No. 2018-184504, filed on Sep. 28, 2018, the entire subject matter of which is incorporated herein by reference.

BACKGROUND

Technical Field

An aspect of the present disclosure is related to a printing apparatus and a computer-readable storage medium storing a program for the printing apparatus.

Related Art

A printing apparatus capable of printing an image based on print data is widely used. The printing apparatus may rasterize image data described in a page description language, generate print data for printing an image on a sheet from the rasterized data, and print the image based on the generated print data. However, a sequence to generate data from image data may vary in several patterns depending on additional settings or optional processes. For example, a printing apparatus may rasterize image data, and before generating print data from the rasterized data, rotate images in the rasterized data.

SUMMARY

Rotation of the image in the rasterized data may be achieved through processes in a hardware device that may generate print data. The hardware device may accelerate the rotating process for the rasterized data; however, while an amount of the rasterized data tends to be larger compared to the original image data, the rotating process for the size-increased rasterized data may require a larger volume in a memory device. On the other hand, if the rotation of the image in the rasterized data is attempted in a smaller-sized memory, the rasterized data may need to be sampled to a lower resolution, and a quality of an image printed based on the sampled rasterized data in the lower resolution may not be satisfactory to the user.

The present disclosure is advantageous in that a technique for a printing apparatus, in which an image in data may be rotated in a smaller-sized memory while a quality of the printed image may be prevented from being lowered, is provided.

According to an aspect of the present disclosure, a non-transitory computer readable storage medium storing computer readable instructions that are executable by a computer in an information processing apparatus, is provided.

According to another aspect of the present disclosure, a printing apparatus, including a printing device, a communication interface, a memory, and a controller, is provided. The controller is configured to execute a receiving process, in which the controller receives image data described in a page description language through the communication interface, a rasterizing process, in which the controller rasterizes the image data and stores raster data being the rasterized image data in the memory, and a generating process, in which the controller generates print data for the raster data stored in the memory to cause the printing device to print a printing image on a sheet based on the printing data. The controller is configured to further execute a condition determining process, in which the controller determines whether a predetermined condition indicating that a quality of printing the printing image based on the print data is set at a predetermined level or higher is satisfied, and a rotation determining process, in which the controller determines whether an image in the image data is to be rotated. In a case where the controller determines in the rotation determining process that the image in the image data is to be rotated and in the condition determining process that the predetermined condition is satisfied, the controller in the rasterizing process conducts rotation of the image in the image data concurrently with rasterization of the image data and stores the raster data including the rotated image in the memory. In a case where the controller determines in the rotation determining process that the image in the image data is to be rotated and in the condition determining process that the predetermined condition is not satisfied, the controller in the rasterizing process conducts rasterization of the image data without rotating the image in the image data, and in the generating process rotates a raster image in the raster data stored in the memory and generates the print data from the raster data including the rotated raster image.

According to another aspect of the present disclosure, a non-transitory computer readable storage medium storing a set of program instructions for an information processing apparatus comprising a processor, a communication interface, and a memory, is provided. The set of program instructions, when executed by the processor, cause the information processing apparatus to receive image data described in a page description language through the communication interface, rasterize the image data and store raster data being the rasterized image data in the memory, and generate print data from the raster data stored in the memory to cause the printing device to print a printing image on a sheet based on the printing data. The set of program instructions, when executed by the processor, further cause the information processing apparatus to determine whether a predetermined condition is satisfied, the predetermined condition indicating that a quality of printing the printing image based on the print data is set at a predetermined level or higher, and determine whether the image in the image data is to be rotated. In a case where processor determines that the image in the image data is to be rotated and that the predetermined condition is satisfied, the processor conducts rotation of the image in the image data concurrently with rasterization of the image data and stores the raster data including the rotated image in the memory. In a case where the processor determines that the image in the image data is to be rotated and that the predetermined condition is not satisfied, the processor conducts rasterization of the image data without rotating the image in the image data, and rotates a raster image in the raster data stored in the memory and generates the print data from the raster data including the rotated raster image.

BRIEF DESCRIPTION OF THE ACCOMPANYING DRAWINGS

FIG. 6 is an example of commands in PCLXL to be received in the printer according to the embodiment of the present disclosure.

FIG. 7 is an example of commands in PCL5 to be received in the printer according to the embodiment of the present disclosure.

DETAILED DESCRIPTION

Hereinafter, with reference to the accompanying drawings, described below will be a printer 100 being a printing apparatus according to the embodiment of the present disclosure.

Figure 1:
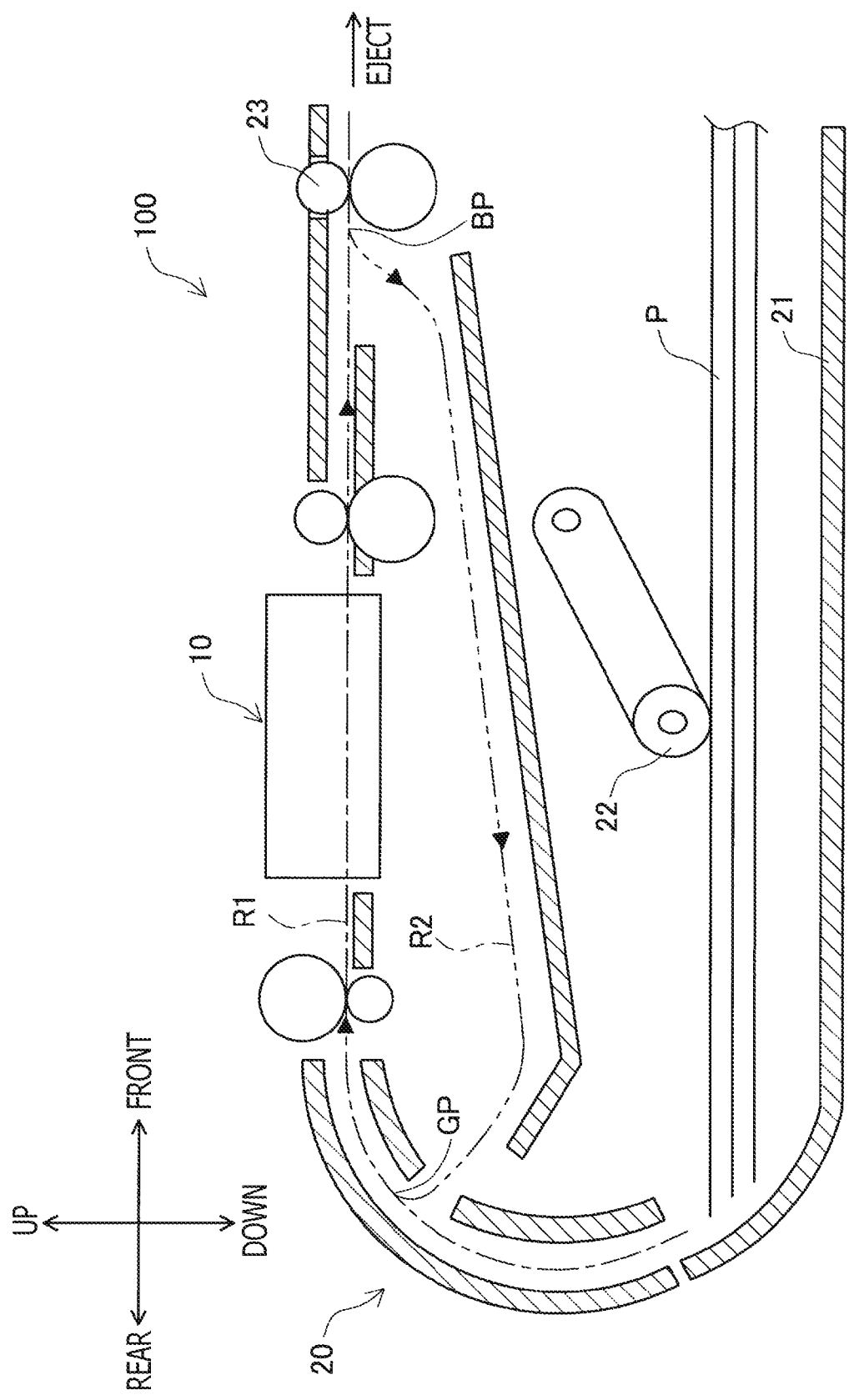
FIG. 1 is an illustrative cross-sectional view of a printer according to an embodiment of the present disclosure.

The printer 100 may be an inkjet printer and includes, for example, as shown in FIG. 1, a printing device 10 for printing an image on a sheet P and a conveyer 20 for conveying the sheet P to the printing device 10. The printer 100 may be, but not necessarily limited to, a multicolor printer to print multicolored images and may be capable of printing in, not only in single-sided printing to print an image on solely one side of a sheet P, but also in double-sided printing to print images on both sides of a sheet P.

The printing device 10 in the printer 100 may, for example, include a printing head, a carriage, and a platen, which are not shown, and may discharge ink at the sheet P being conveyed through a range between the platen and the printing head to print an image on one side of the sheet P. As shown in FIG. 1, the printing head may be arranged at an upper position with respect to a conveying path for the sheet P so that the image may be printed on an upper side of the sheet P conveyed through the printing device 10. It may be noted that the printer 100 may not necessarily be an inkjet printer but may be, for example, an electro-photographic printer or a thermal-transfer printer.

The conveyer 20 in the printer 100 may include, for example, as shown in FIG. 1, a feeder tray 21, a plurality of conveyer rollers, and guides to guide the sheet P being conveyed. The sheets P placed on the feeder tray 21 may be picked up one by one and guided to be conveyed to the printing device 10. For image printing in the single-sided setting, the sheet P picked up from the feeder tray 21 by a feeder roller 22 may be conveyed in a path R1, which is indicated in a dash-and-dot line in FIG. 1, to have an image printed on the upper side thereof, and ejected outside the printer 100.

For image printing in the double-sided setting, on the other hand, the conveyer 20 may, after an image is printed on one side of a sheet P in the printing device 10, withdraw the sheet P without ejecting completely outside and convey in a path that detours around the printing device 10 to invert the sheet P. In particular, the conveyer 20 may, as shown in FIG. 1, convey the sheet P in the path R1 to pass through the printing device 10 to an ejection roller 23 and, once a rearward end of the sheet P reaches a branch point BP, stop rotation of the ejection roller 23. Thereby, the sheet P may stop thereat while the ejection roller 23 holds the sheet P The conveyer 20 may again rotate the ejection roller 23, not in the same direction but in a reverse direction, to convey the rearward end of the sheet P to enter a path R2, which is indicated in dash-and-double-dots line in FIG. 1, from the branch point BP The path R2 merges with the path R1 at a merging point GP, which is on an upstream side of the printing device 10 in a conveying direction for the sheet P to be conveyed in the path R1. The sheet P conveyed through the path R2 and returning in the path R1 is in an upside-down and back-to-front inverted orientation with respect to an orientation of the sheet P when the sheet P first conveyed through the path R1 to have the image printed on the first side. The printing device 10 may print an image on the second side facing upward, and the conveyer 20 may eject the sheet P with the images printed on the first and second sides outside.

Figure 2:
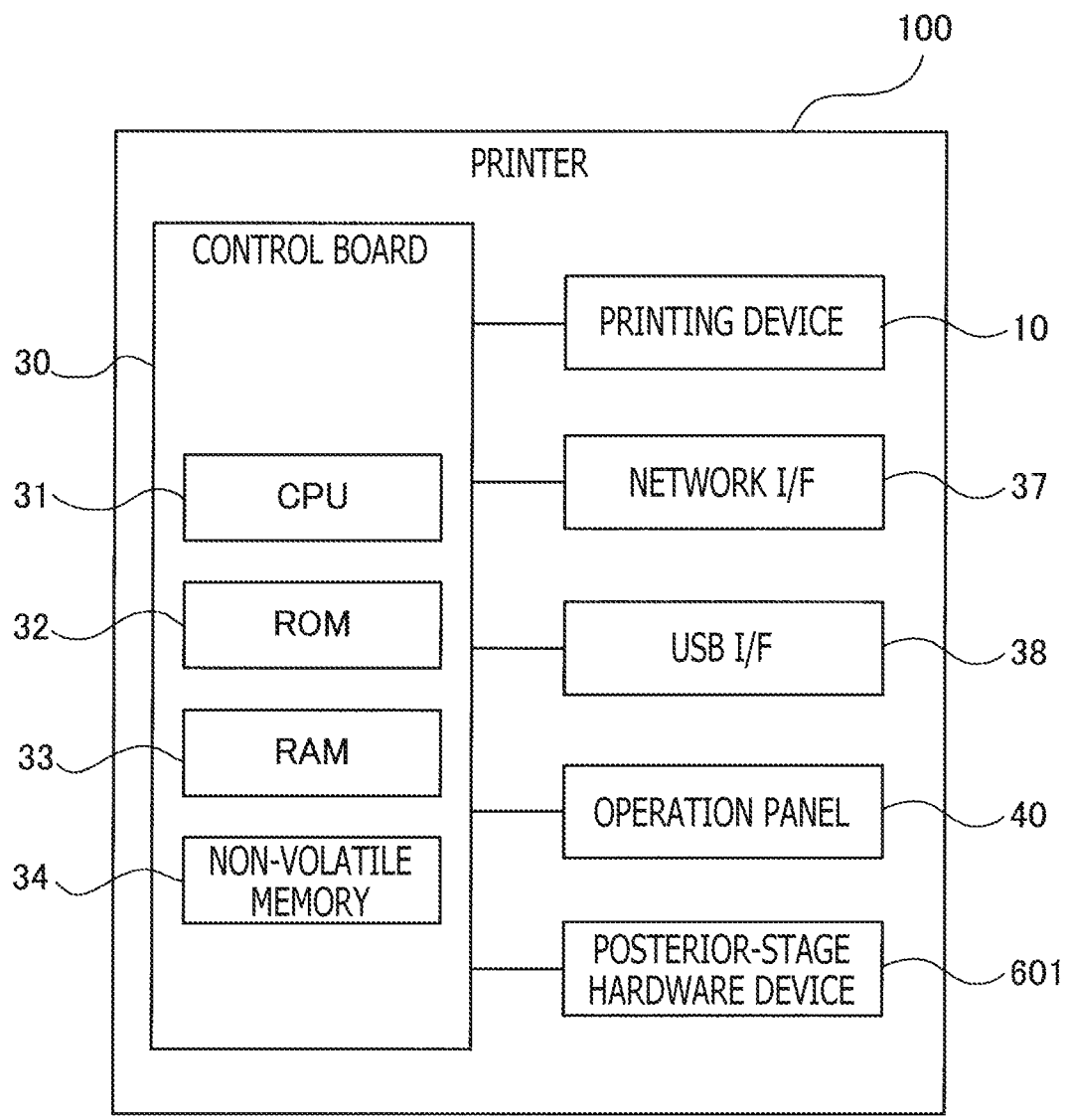
FIG. 2 is a block diagram to illustrate an electrical configuration of the printer according to the embodiment of the present disclosure.

Next, with reference to FIG. 2, described below will be an electrical configuration of the printer 100. The printer 100 includes, as shown in FIG. 2, a control board 30 including a CPU 31, a ROM 32, a RAM 33, and a non-volatile memory 34. Moreover, the printer 100 includes the printing device 10, a network interface (I/F) 37, a USB I/F 38, an operation panel 40, and a posterior-stage hardware device 601, which are electrically connected with the control board 30.

The CPU 31 may conduct processes according to programs called from the ROM 32 or the non-volatile memory 34 and according to the user's input. It may be noted that the control board 30 shown in FIG. 1 may be a collection of hardware devices that may be used to control the printer 100. In other words, the control board 30 may not necessarily represent a single hardware device that is disposed in the printer 100.

The ROM 32 stores programs including a booting program to boot the printer 100. The RAM 33 may serve as a work area to be used by the processes executed by the CPU 31 and a memory area to store data temporarily. The non-volatile memory 34 may include, for example, an HDD and a flash memory, which may serve as a work area for the processes to be executed by the CPU 31 and a storage area to store data temporarily. Optionally, the CPU 31 may have a CPU buffer to serve as a memory.

The network I/F 37 includes a hardware device that enables the printer 100 to communicate with an external device. The USB I/F 38 includes a hardware device that enables the printer 100 to communicate with an external device connected through, for example, a USB cable. The operation panel 40 may include, for example, a touch panel that may both display messages and accept operations rendered by a user.

The printer 100 may receive image data for printing described in a page description language from an external device through the network I/F 37 or the USB I/F 38. In the following paragraphs, the image data for printing described in a page description language may be referred to as "PDL data." The page description language is a programming language to cause a printer to print images and includes, for example, PCL (registered trademark), Postscript (registered trademark), and LIPS (registered trademark).

Figure 3:
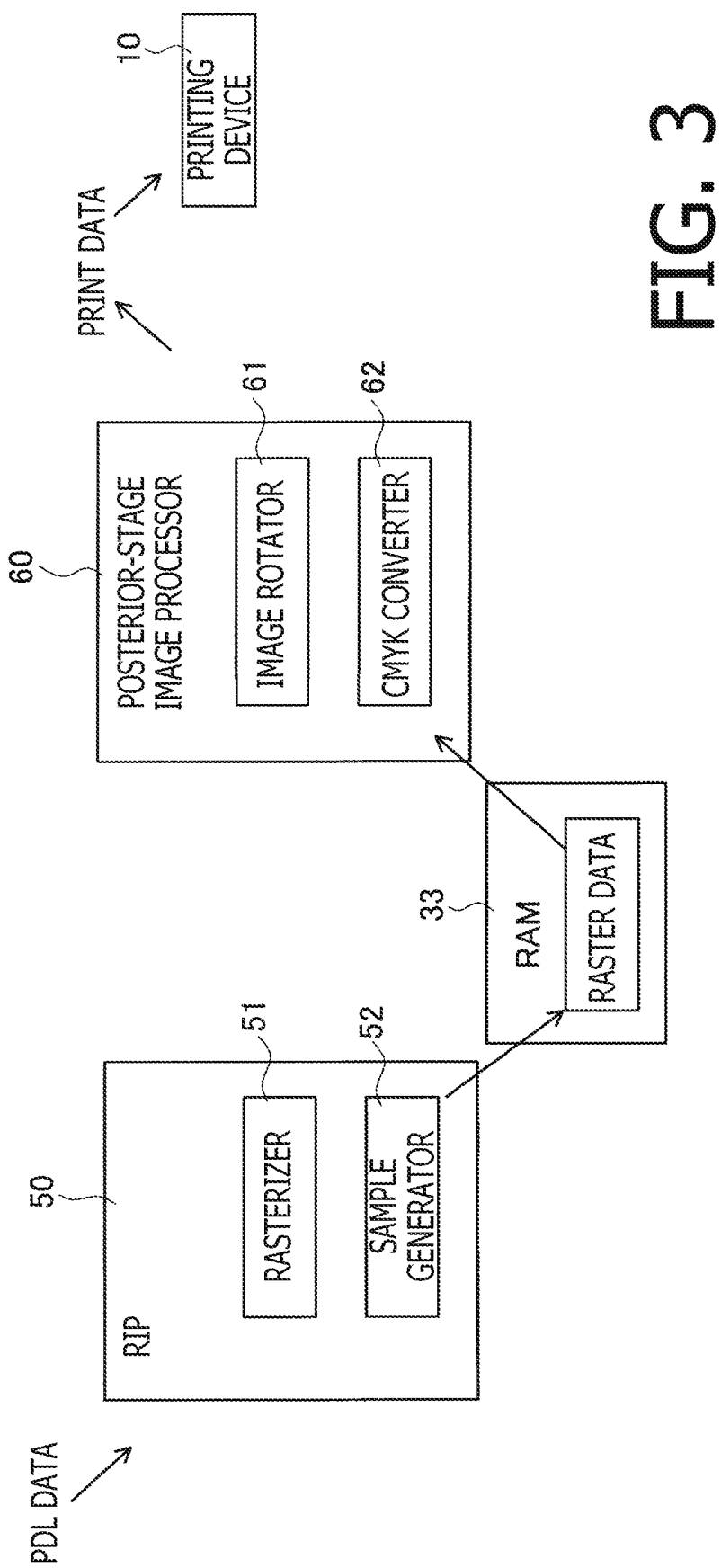
FIG. 3 is an illustrative view of a procedure to generate print data in the printer according to the embodiment of the present disclosure.

Based on the received PDL data, the printer 100 may generate print data to be used for image printing in the printing device 100. The printer 100 is equipped with a raster image processor (RIP) 50 and a posterior-stage image processor 60, which may generate print data, as shown in FIG. 3. The RIP 50 and the posterior-stage image processor 60 may each consist of either a software module alone or a combination of a software module and hardware device(s). In the printer 100 according to the present embodiment, for example, the RIP 50 is a software module, and a posterior-stage image processor 60 is a hardware-aided software module. In other words, the RIP 50 is configured with software program(s) stored in the ROM 32, and the posterior-stage image processor 60 is configured with the posterior-processing hardware device 601 and software program(s) stored in the ROM 32.

The RIP 50 includes, as shown in FIG. 3, a rasterizer 51 and a sample generator 52. The rasterizer 51 may rasterize image data being PDL data and generate raster data being the rasterized image data. The sample generator 52 may extract samples from the raster data to reduce a volume of the data. For example, the RIP 50 may analyze the PDL data and generate raster data of 600 dpi*600 dpi in 8-bit RGB. The sample generator 52 may extract samples from the raster data of 600 dpi*600 dpi to convert into raster data of, for example, 300 dpi*300 dpi. The raster data generated in the RIP 50 may be temporarily stored in the RAM 33.

The posterior-stage image processor 60 includes an image rotator 61 and a CMYK converter 62. The image rotator 61 may rearrange images in the raster data to be rotated, and the CMYK converter 62 may convert the raster data with the rotated images in the RGB format into print data in a CMYK format. In particular, the image rotator 61 may rotate images in the raster data for an angle in multiples of 90 degrees according to a command indicating a rotation angle. The CMYK converter 62 may convert the raster data in the 8-bit RGB format into print data in a CMYK format in a predetermined print resolution. The posterior-stage image processor 60 may read the raster data stored by the RIP 50 in the RAM 33 to generate print data and store the generated print data in the RAM 33. The print data stored in the RAM 33 may be used by the printing device 10 to print the images.

The PDL data includes, additionally to the image data, parameters being information concerning print settings. The parameters concerning the print settings may include, for example, information of a sheet size, an image orientation, a print resolution, and a print quality. The parameters for the print settings such as the sheet size and the image orientation may affect an orientation of an image in the raster data. In other words, depending on the print settings of, for example, the sheet size and the image orientation, the images in the PDL data may need to be rotated so that the images may be arranged correctly on a sheet.

Figure 4:
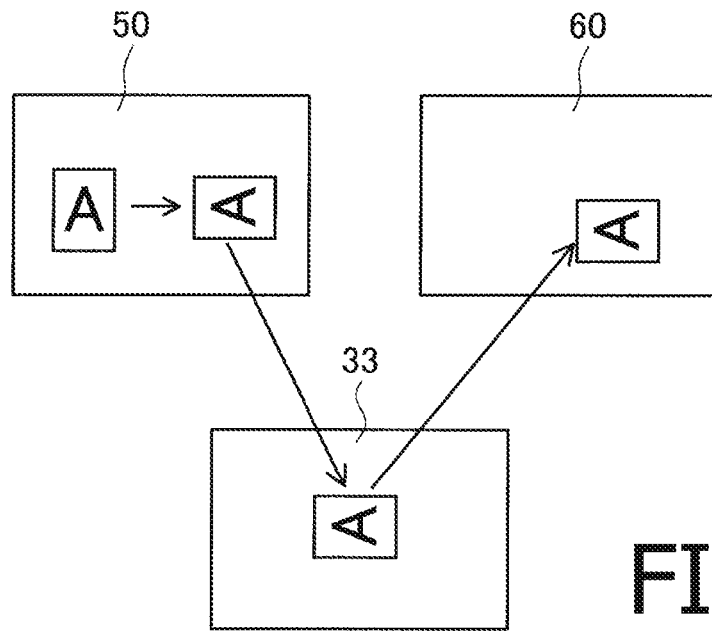
FIG. 4 is an illustrative view of a process to rotate an image through a rasterizer in the printer according to the embodiment of the present disclosure.
Figure 5:
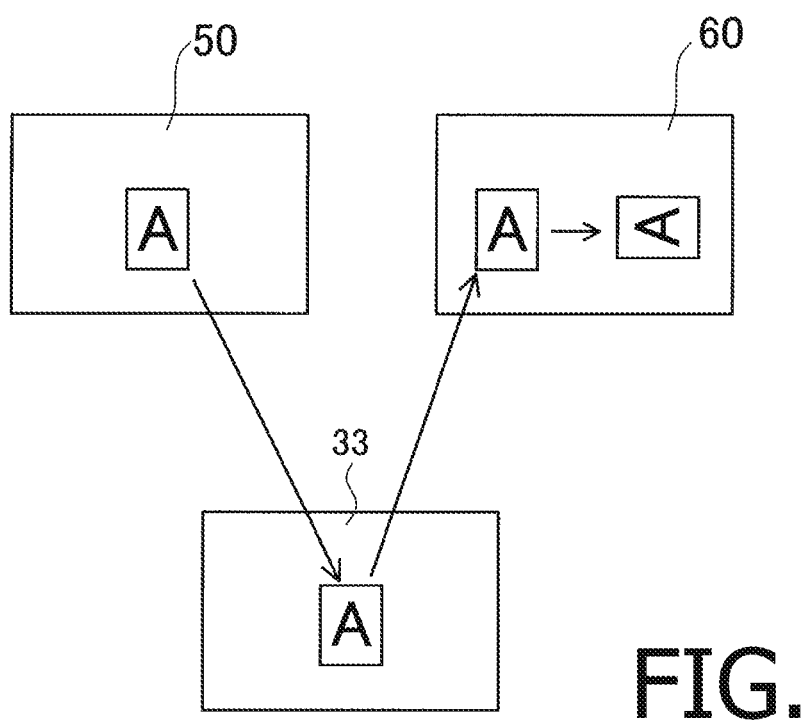
FIG. 5 is an illustrative view of a process to rotate an image in an image rotator in the printer according to the embodiment of the present disclosure.

When rotation of the image in the image data is necessary, the image may be rotated in either the RIP 50 or the posterior-stage image processor 60. In order to rotate the image in the RIP 50, the printer 100 may, as shown in FIG. 4, rotate the image rasterize the image data in parallel concurrently in the rasterizer 51 in the RIP 50 to generate raster data with a rotated image and store the generated raster data in the RAM 33. Therefore, the image may not be further rotated in the image rotator 61 in the posterior-stage image processor 60. On the other hand, in order to rotate the image in the posterior-stage image processor 60, the printer 100 may, as shown in FIG. 5, generate raster data with an unrotated image in the rasterizer 51 and store the generated raster data in the RAM 33. The image in the raster data stored in the RAM 33 may be rotated in the image rotator 61 in the posterior-stage image processor 60.

Rotating the image in the raster data by the image rotator 61 as shown in FIG. 5 may be accelerated due to the aid of the hardware device in the posterior-image processor 60; however, rotation of the image in the raster data in a high resolution without sampling may require a larger amount of the memory. On the other hand, rotating the image in the image data by the rasterizer 51 as shown in FIG. 4 may not require as large amount of the memory as the image rotation by the image rotator 61 rotating the image in the high resolution. However, the image rotation in the rasterizer 51 may not be processed as speedily as the image rotation in the image rotator 61.

In this regard, the printer 100 of the present embodiment may determine by which of the rasterizer 51 and the image rotator 61 the image rotation should be processed depending on a print quality of the image to be printed by the print data, when rotation of an image is determined to be necessary. For example, if a print setting of a high resolution or a high quality is applied to a print job, it may not be preferable to lower the resolution of the image in order to rotate the image. Therefore, the printer 100 may select to rotate the image in the rasterizer 51, which does not require sampling. For another example, if lowering the resolution for image rotation is assumed to be allowable because, for example, no setting of a high resolution or a high quality is applied to the print job, the printer 100 may select to lower the resolution for sampling and rotate the image afterwards in the image rotator 61.

The printer 100 in the present embodiment supports a plurality of PDLs, including, for example, PCL. While PCL has a plurality of versions, components in commands may differ among different versions. For example, command components may be different between PCLXL and PCL5, which are both supported by the printer 100 in the present embodiment.

For example, in PCLXL, a command indicating a sheet size and a command indicating an image orientation are mandatory and not omittable. Therefore, the printer 100 may receive Orientation command 72 indicating an image orientation and MediaSize command 73 indicating a sheet size before receiving BeginPage command 71, which triggers rasterization, as shown in FIG. 6. In other words, before BeginPage command 71 is received, the sheet size and the image orientation are inputted. Therefore, if the PDL for the received image data is PCLXL, based on the commands concerning the sheet size and the image orientation, the printer 100 may determine whether the image requires rotation, and if the image rotation is determined to be necessary, which one of the rotating processes by the rasterizer 51 or the image rotator 1 should be taken, before receiving a next command such as a print command.

On the other hand, in PCL 5, the command indicating a sheet size and the command indicating an image orientation are not mandatory but both are omittable. The printer 100 may, for example, as shown in FIG. 7, receive Local Page Orientation command 81 indicating an orientation of the image and Page Size command 82 indicating a sheet size, before receiving Start Raster Graphics command 83, which triggers rasterization, in some cases. In other cases, for example, the printer 100 may receive Start Raster Graphics command 83 without receiving either Local Page Orientation command 81 or Page Size command 82. If the command indicating a sheet size or an image orientation is omitted, the printer 100 may apply a default setting given to the printer 100 in advance. Therefore, when these commands 81, 82 are omitted, the printer 100 may recognize the omission of the commands 81, 82 for the first time when the printer 100 receives Start Raster Graphics command 83. In such a case, the printer 100 may not determine whether the image rotation is necessary or not until Start Raster Graphics command 83 is received. Moreover, according to PCL5, receiving of the image data and rasterization of the image data may start as soon as Start Raster Graphics command 83 is received. In this regard, at the time when the printer 100 receives Start Raster Graphics command 83, it may be necessary that the processing procedure is decided.

Thus, with the difference in commands among the versions of the PDL language, the printer 100 may conduct different processes depending whether the received PDL data is described in PCLXL or PCL5.

Figure 8:
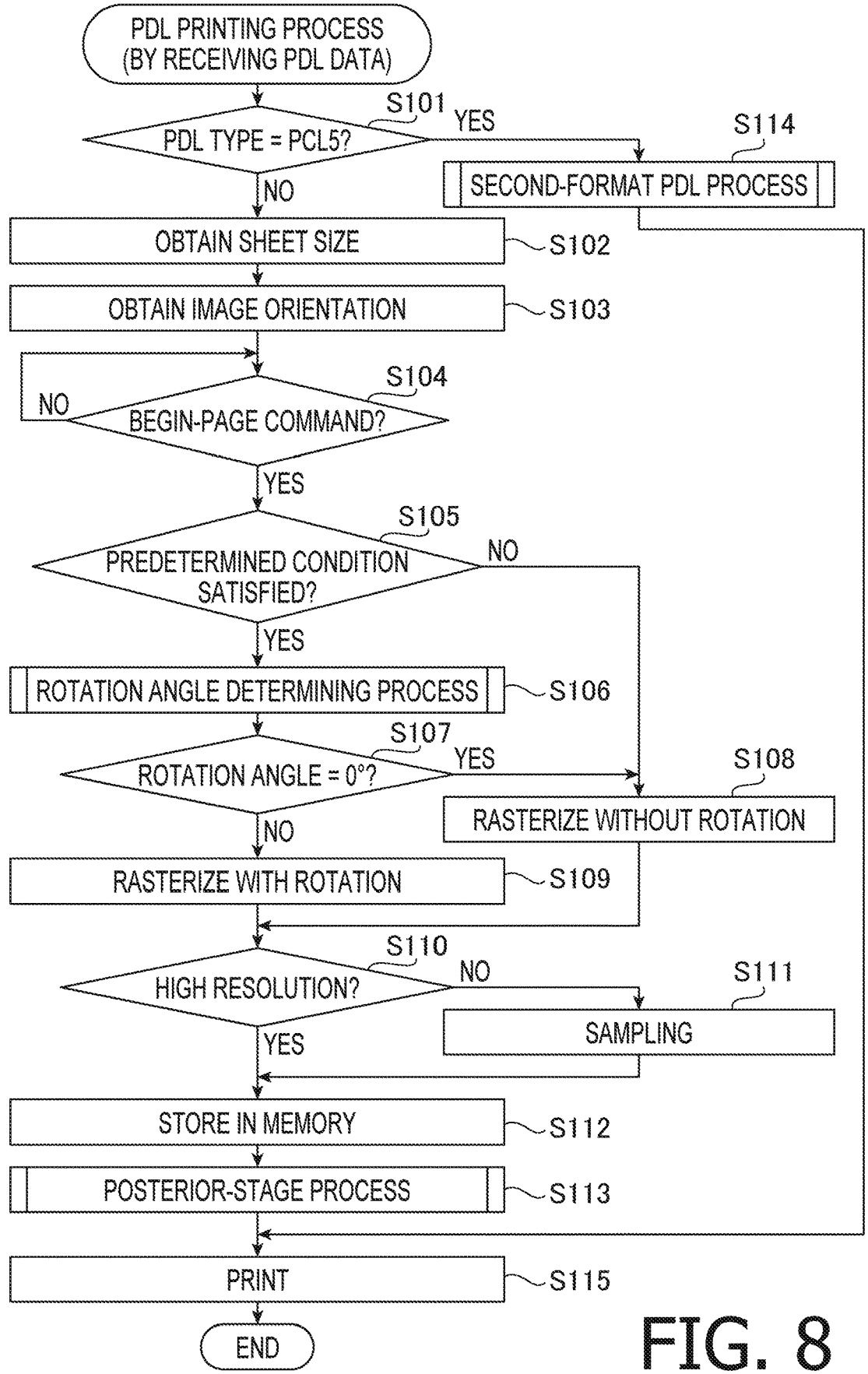
FIG. 8 is a flowchart to illustrate a flow of steps in a PDL printing process to be executed in the printer according to the embodiment of the present disclosure.

Next, in the following paragraphs, with reference to FIG. 8, described will be steps in a PDL printing process, in which PDL data is processed to form an image. The PDL printing process may be triggered by a print job described in the PDL, when the print job is received in the printer 100, and executed by the CPU 31 in the printer 100.

In S101, the CPU 31 determines whether a type of the PDL describing the received print job is PCL5 or not. The printer 100 may determine the type of the PDL for the print job before receiving the PDL data based on setting information included in the print job.

According to PCL5, as described above, one or both of the parameters being the settings of the sheet size and the image orientation is/are omittable. In S101, if the type of the PDL is PCL5 (S101: YES), the flow proceeds to S114, which will be described further below. In S101, moreover, if the type of the language describing the received print job is not PCL but is a language, in which commands concerning the sheet size and the image orientation are omittable similarly to PCL5, the CPU 31 may make an affirmative determination S101 (S101: YES).

If, for example, the CPU 31 determines that the PDL is not PCL5 but PCLXL (S101: NO), in S102, the CPU 31 obtains sheet size information from the print parameter included in the print job. In other words, the CPU 31 obtains a sheet size indicated in MediaSize command 73. In S103, the CPU 31 obtains image orientation information from the print parameter included in the print job. In other words, the CPU 31 obtains an image orientation indicated in Orientation command 72.

According to PDLs other than PCL5, the PDL data at least includes the commands indicating the sheet size and the image orientation as print parameters. Therefore, the CPU 31 may obtain the sheet size information and the image orientation information from the print parameters prior to receiving the PDL image data. Meanwhile, the steps S102 and S103 may not necessarily be conducted in this order but may be executed in a reversed order as long as the steps are conducted in accordance with an order of the print parameters being described.

In S104, the CPU 31 determines whether a begin-page command is received. In particular, the CPU 31 determines whether BeginPage command 71 (see FIG. 6) is received. If no begin-page command is received (S104: NO), the CPU 31 waits until a begin-page command is received.

If the CPU 31 determines that a begin-page command is received (S104: YES), in S105, the CPU 31 determines whether a predetermined condition to determine a print quality is satisfied. The predetermined condition may include that the print quality set to the print job is at a predetermined level or higher. For example, the CPU 31 may determine that the predetermined condition is satisfied when at least when one of the following three conditions is satisfied: when a resolution of the image data is set to be higher than or equal to a predetermined level, when a high-resolution print setting is applied to the print job, and when a high-qualitied print setting is applied to the print job. In this example, if the CPU 31 determines that the print resolution set to the print job is higher than a predetermined level, the CPU 31 may determine that a high-resolution print setting is applied to the print job.

Moreover, even when the high-resolution print setting is applied to the print job, if the CPU 31 determines that the image data requires a memory amount which is larger than a predetermined amount to generate print data, the CPU 31 may determine that the predetermined condition is not satisfied. In other words, the CPU 31 may determine that the predetermined condition is satisfied when the print quality is high and when the required memory amount is a smaller than or equal to the predetermined amount. On the other hand, when the print quality is low, or when the print quality is high but the required memory amount is larger than the predetermined amount, the CPU 31 may determine that the predetermined condition is not satisfied.

In S105, if the CPU 31 determines the predetermined condition is satisfied (S105: YES), in S106, the CPU 31 conducts a rotation angle determining process, in which the CPU 31 determines whether rotation of the image is necessary, and if the rotation of the image is determined to be necessary, the CPU 31 determines a rotation angle for the image rotation.

Figure 9:
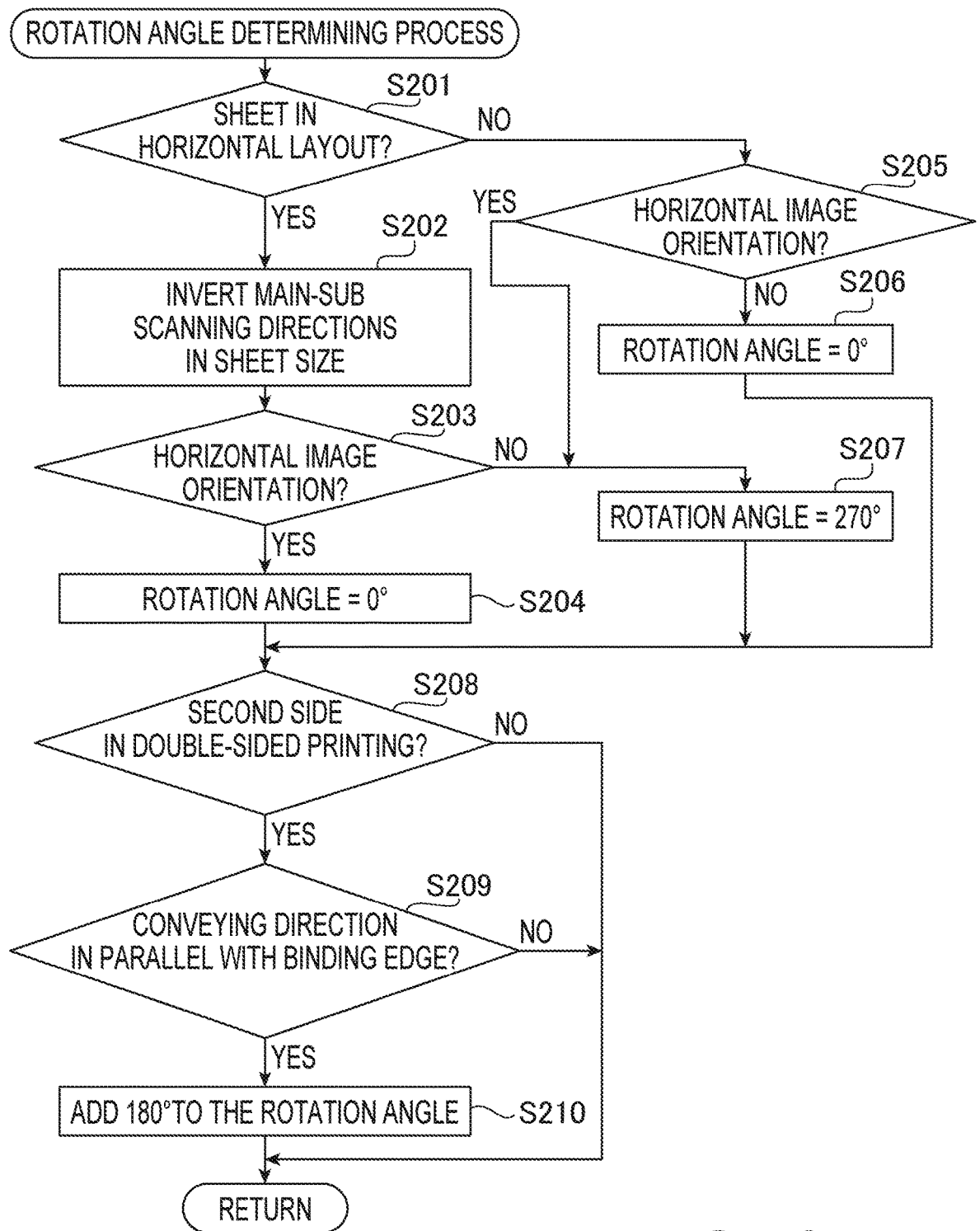
FIG. 9 is a flowchart to illustrate a flow of steps in a rotation angle determining process to be executed in the printer according to the embodiment of the present disclosure.

In the following paragraphs, with reference to FIG. 9, described will be steps in the rotation angle determining process. In S201, the CPU 31 determines based on the sheet size information whether the sheet designated for the print job is a sheet in a horizontal layout. The sheet in the horizontal layout refers to a sheet arranged in the landscape layout with respect to the conveying direction and may be conveyed for image printing in parallel with the orientation of the shorter edges thereof.

The printer 100 is designed such that sheets in the letter size and A4 size may be arranged in the horizontal layout, in which the shorter edges of the sheets align with the conveying direction, in the feeder tray 21. Meanwhile, sheets in A3, A5, and A6 sizes may be arranged in a vertical layout, in which the longer edges of the sheets align with the conveying direction, in the feeder tray 21. In other words, the orientation of the sheets may depend on the sheet size. Therefore, the CPU 31 determines whether the sheet is in the horizontal layout or the vertical layout based on the sheet size information. Alternately, for example, the feeder tray 21 may have sheet sensors, and the CPU 31 may determine the layout of the sheet depending on results output from the sheet sensors. Further alternately, the CPU 31 may determine the layout of the sheet depending on user information set in the printer 100.

In S201, if the CPU 31 determines that the sheet is in the horizontal layout (S201: YES), in S202, the CPU 31 inverts a value in the sheet size information concerning a main scanning direction with a value in the sheet size information concerning a sub-scanning direction. The sheet size information includes information indicating a dimension of the sheet in the main scanning direction and a dimension of the sheet in the sub-scanning direction. While the sheet size information that the CPU 31 receives as a command indicates a size of the sheet in the vertical layout, in order to print the image on the sheet in the horizontal layout, the CPU 31 needs to interchange the values indicating the dimension in the main scanning direction with the values indicating the dimension in the sub-scanning direction.

In S203, the CPU 31 refers to the image orientation information and determines whether the information indicates horizontal orientation as the image orientation. The horizontal orientation refers to an orientation of the image intended to be printed on the sheet in the landscape layout, and the image in the horizontal orientation should appear such that a top and a bottom thereof are located toward the longer edges of the sheet. Therefore, in S203, if the CPU 31 determines that the image orientation information indicates horizontal orientation (S203: YES), in S204, the CPU 31 determines that a rotation angle to be zero (0) degrees. In other words, in order to print the image in the horizontal orientation on the sheet in the horizontal layout, no rotation of the image is necessary.

If the CPU 31 determines that the sheet is not in the horizontal layout (S201: NO), in S205, the CPU 31 determines whether the image orientation information indicates horizontal orientation. The action in S205 may be similar to the action in S203. If the CPU 31 determines that the image orientation information indicates horizontal orientation (S205: YES), in S206, the CPU 31 determines that the rotation angle to be zero (0) degrees. In other words, in order to print the image in a vertical orientation on the sheet in the vertical layout, no rotation of the image is necessary.

In S203, meanwhile, if the CPU 31 determines that the sheet is in the horizontal layout (S201:YES), but the image orientation is not horizontal orientation (S203: NO), or if the CPU 31 determines that the sheet is in the vertical layout (S201: NO), but the image orientation is horizontal orientation (S205: YES), in S207, the CPU 31 determines the rotation angle to be 270 degrees. In the printer 100 of the present embodiment, the rotation angle to rotate the image is defined in clockwise direction. Therefore, the rotation angle of 270 degrees may refer to an arrangement of the image, with reference to an origin at a lower-left corner of the sheet, such that a top of the image is located toward a leftward edge of the sheet.

In S208, the CPU 31 determines whether a page to be printed immediately next is a second side, with an image already being printed on a first side being the other side, within a double-side printing sheet. For a double-side printing sheet, in order to place the second side upward, the sheet is turned over after an image is printed on the first side; therefore, the sheet is in an upside-down and back-to-front inverted orientation with respect to the orientation of the sheet when the sheet was first conveyed through the printing device 10 to have the image printed on the first side. In this regard, when a print setting of long-edge binding is applied to a sheet in the vertical layout and when a print setting of short-edge binding is applied to a sheet in the horizontal layout, the image may need to be inverted vertically.

In S208, if the CPU 31 determines that the page to be printed immediately next is a second side in double-sided printing (S208: YES), in S209, the CPU 31 determines whether an edge of the sheet extending along the conveying direction conforms with a binding edge of the sheet. If the CPU 31 determines that an edge along the conveying direction conforms with the binding edge (S209: YES), in S210, the CPU 31 adds an angle of 180 degrees to the rotation angle determined earlier in one of S204, S206, and S207 and exits the rotation angle determining process. In S208, on the other hand, if the CPU 31 determines that the page to be printed immediately next is not a second side in double-sided printing (S208: NO), or in S209, if the CPU 31 determines that the edge along the conveying direction does not conform with the binding edge (S209: NO), the CPU 31 maintains the rotation angle determined earlier in one of S204, S206, and S207 and exits the rotation angle determining process.

Referring back to FIG. 8, the PDL printing process will be further described. Following the rotation angle determining process in S106, in S107, the CPU 31 determines whether the determined rotation angle is zero degrees. If the CPU 31 determines that the determined rotation angle is zero degrees (S107: YES), or in S105, if the CPU 31 determines that the predetermined condition is not satisfied (S105: NO), in S108, the CPU 31 rasterizes the PDL data in the rasterizer 51 in the RIP 50 without rotating the image.

On the other hand, in S107, if the CPU 31 determines that the determined rotation angle is not zero degrees (S107: NO), in S109, the CPU 31 rasterizes the PDL data in the rasterizer 51 in the RIP 50 with rotation of the image. In particular, coordinate axes and vectors in the image data are converted for an amount equivalent to the determined rotation angle to generate the raster data including rotation. In other words, in S109, rotation and rasterization of the image are performed concurrently.

Following S108 or S109, in S110, the CPU 31 determines whether the image in the raster data is to be printed in a high resolution. If the CPU 31 determines that the image is not to be printed in a high resolution (S110: NO), in S111, the CPU 31 samples the PDL data in the sample generator 52. The CPU 31 may determine that the image in the raster data is not to be printed in a high resolution when the CPU 31 determines that the predetermined condition is not satisfied in S105. If a high-resolution setting is not applied to the print job, no image data in a high resolution is necessary. Therefore, in order to reduce load on the posterior-stage image processor 60, the PDL data may be sampled to reduce an amount of the data. Meanwhile, in S105, when the CPU 31 determines that the predetermined condition is not satisfied because the high-qualitied print setting is applied to the print job, and a memory amount required for the rasterization is larger than a predetermined amount, the CPU 31 may sample the PDL data in S111. Accordingly, an amount of the memory to be used may be reduced.

Following S111 or an affirmative determination in S105 that the predetermined condition is satisfied and the image in the raster data is to be printed in a high resolution (S110: YES), in S112, the CPU 31 stores the generated raster data in the RAM 33. According to this flow, the raster data generated in the rasterization with rotation in S109 or the raster data generated in the rasterization without rotation based on the affirmative determination in S107 (S107: YES) is stored in the RAM 33 without being sampled.

In S113, the CPU 31 conducts a posterior-stage process, in which print data is generated from the raster data stored in the RAM 33. The posterior-stage process in performed by the posterior-stage image processor 60.

Figure 10:
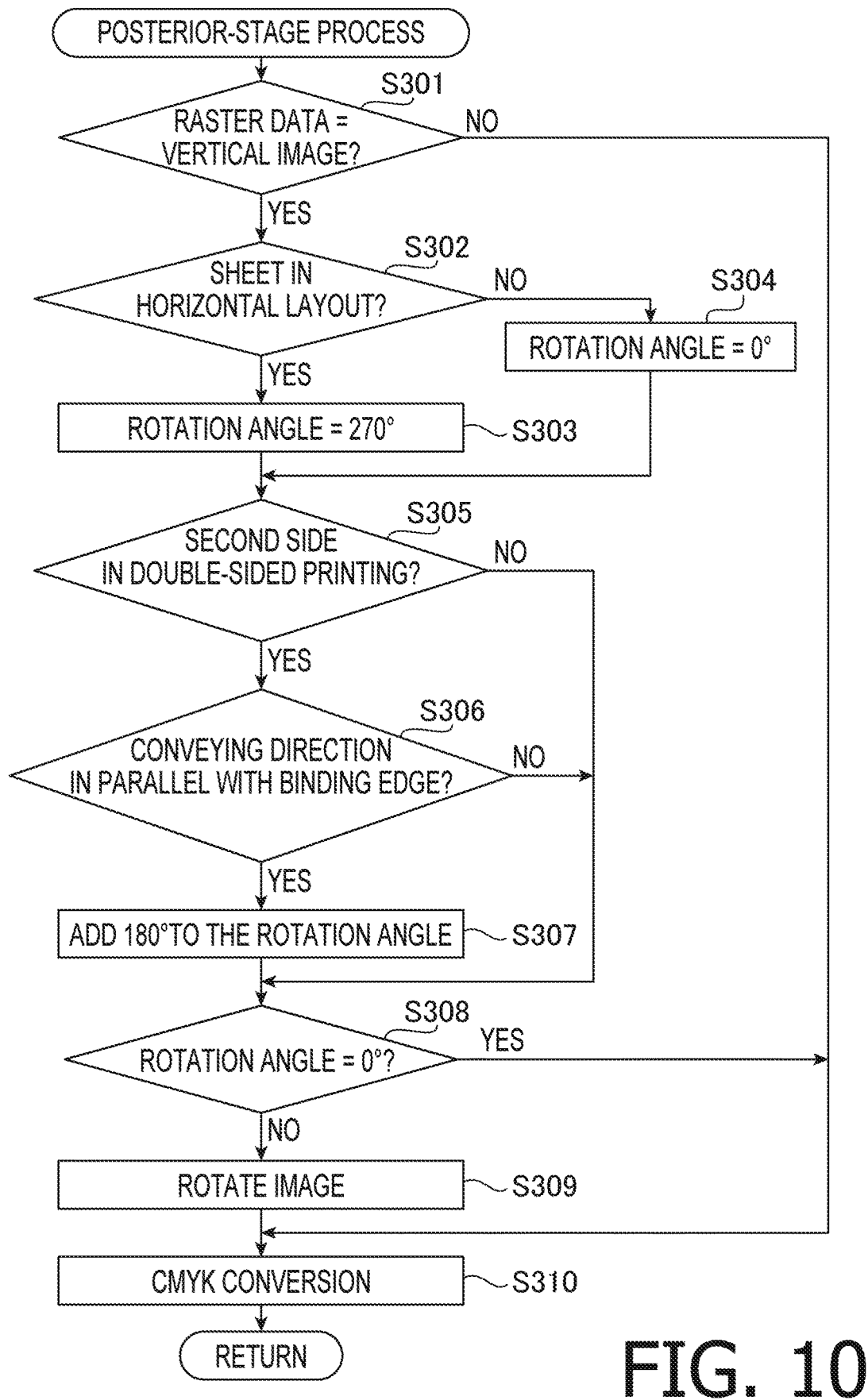
FIG. 10 is a flowchart to illustrate a flow of steps in a posterior-stage process to be executed in the printer according to the embodiment of the present disclosure.

In the following paragraphs, with reference to FIG. 10, described will be steps in the posterior-stage process. In S301, the CPU 31 determines whether the image in the raster data stored in the RAM 33 is a vertical image. The CPU 31 may make the determination in S301 based on the size of the image. In particular, if a dimension of the image in the sub-scanning direction is larger than a dimension of the image in the main scanning direction, the CPU 31 may determine that the image is a vertical image. The dimensions of the image are stored in the RAM 33 alongside the raster data.

In S301, if the CPU 31 determines that the image in the raster data is a vertical image (S301: YES), in S302, the CPU 31 determines whether the dimensions of the image conform with the sheet in the horizontal layout. As described earlier, in the printer 100 of the present embodiment, sheets in the letter size and A4 size are loaded in the horizontal layout, in which the shorter edges thereof align with the conveying direction, in the feeder tray 21. In this regard, in S301, the CPU 31 determines whether the dimensions of the image in the main scanning direction and the sub-scanning direction conform with either the letter size or A4 size.

In S302, if the CPU 31 determines that the dimensions of the image in the raster data conform with the sheet in the horizontal layout (S302: YES), in S303, the CPU 31 determines the rotation angle to be 270 degrees. In S302, on the other hand, if the CPU 31 determines that the dimensions of the image in the raster data do not conform with the sheet in the horizontal layout (S302: NO), in S304, the CPU 31 determines the rotation angle to be zero degrees.

Following S303 or S304, in S305, the CPU 31 determines whether a page to be printed immediately next is a second side in double-sided printing. In S305, if the CPU 31 determines that the page to be printed immediately next is a second side in double-sided printing (S305: YES), in S306, the CPU 31 determines whether an edge of the sheet along the conveying direction conforms with a binding edge of the sheet. If the CPU 31 determines that the edge along the conveying direction conforms with the binding edge (S306: YES), in S307, the CPU 31 adds an angle of 180 degrees to the rotation angle determined earlier in one of S303 and S304. The actions in S305-S307 may be similar to the actions in S208-S210 in the rotation angle determining process.

Following one of S307, a negative determination in S305 that the page to be printed immediately next is not a second side in double-sided printing (S305: NO), and a negative determination in S306 that the edge along the conveying direction does not conform with the binding edge (S306: NO), in S308, the CPU 31 determines whether the rotation angle determined earlier is zero degrees. If the CPU 31 determines that the determined rotation angle is not zero degrees (S308: NO), in S309, the CPU 31 rotates the image in the raster image through the image rotator 61 in the posterior-stage image processor 60. Thus, the image may be rotated by the hardware-aided image rotator 61 speedily.

Following one of S309, a negative determination in S301 that the image in the raster data is not a vertical image (S301: NO), and an affirmative determination in S308 that the rotation angle is zero degrees (S308: YES), in S310, the CPU 31 converts the raster data into the CMYK format in the CMYK converter 62 in the posterior-stage image processor 60 and exits the posterior-stage process. According to this flow, the print data to be used in the printing device 10 for printing the image may be generated.

Referring back to FIG. 8, the PDL printing process will be further described. In S101, if the CPU 31 determines that the PDL is PCL5 (S101: YES), in S114, the CPU 31 conducts a second-format PDL process. The second-format PDL process may be executed when it is assumable that the sheet size information or the image orientation information may not be included as the print parameters.

Figure 11:
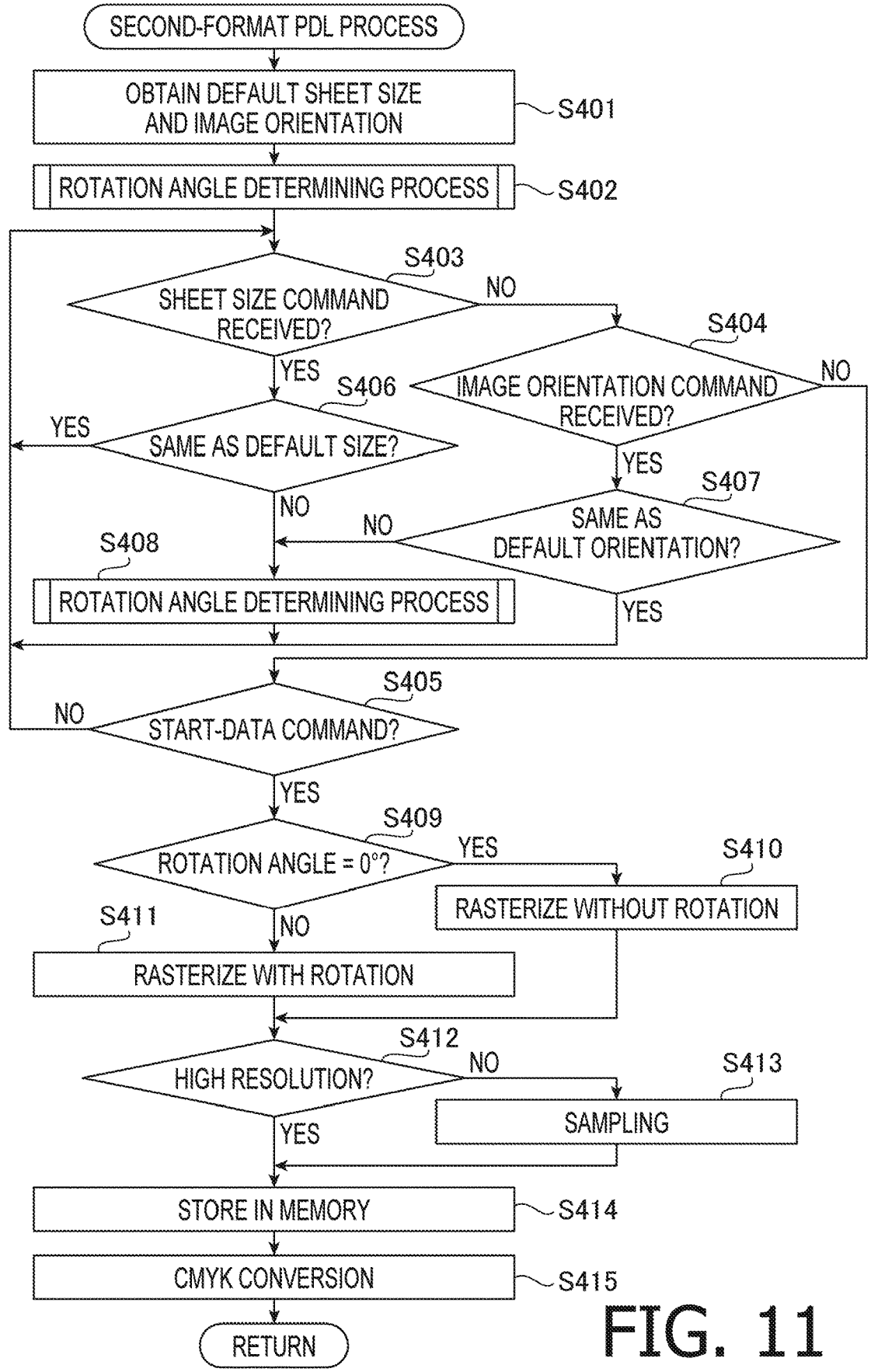
FIG. 11 is a flowchart to illustrate a flow of steps in a second-format PDL process to be executed in the printer according to the embodiment of the present disclosure.

In the following paragraphs, with reference to FIG. 11, described will be steps in the second-format PDL process. In S401, the CPU 31 obtains information indicating a default sheet size and a default image orientation. The information indicating the default sheet size and the default image orientation may be given in advance, for example, by a manufacture as initial settings or by a user and stored in the non-volatile memory 34. In S402, the CPU 31 executes a rotating angle determining process to provisionally determine the rotation angle based on the default sheet size and the default image orientation. The rotation angle determining process in S402 may be similar to the rotation angle determining process in S106 (see also FIG. 9).

Following the rotation angle determining process in S402, in S403, the CPU 31 determines whether a command indicating a sheet size, e.g., Page Size command 82, as a print parameter is included in the commands currently being received. If the CPU 31 determines that no command indicating a sheet size is received (S403: NO), in S404, the CPU 31 determines whether a command indicating an image orientation, e.g., Local Page Orientation command 81, is received. If the CPU 31 determines that no command indicating an image orientation is received (S404: NO), in S405, the CPU 31 determines whether a start-data command is received. In particular, the CPU 31 determines whether Start Raster Graphics command 83 (see FIG. 7) is received.

In S405, if the CPU 31 determines that no start-data command is received (S405: NO), the CPU 31 returns to S403 and waits until one of a command indicating a sheet size, a command indicating an image orientation, and a start-data command is received.

In S403, on the other hand, if the CPU 31 determines that a command indicating a sheet size is received (S403: YES), in S406, the CPU 31 determines whether the sheet size indicated in the received command coincides with as the default sheet size. Meanwhile, in S404, if the CPU 31 determines that a command indicating an image orientation is received (S404: YES), in S407, the CPU 31 determines whether the image orientation indicated in the received command coincides with the default image orientation.

In S406 or in S407, if the CPU 31 determines that the sheet size or the image orientation indicated in the received command is the same as the default sheet size or the default image orientation (S406: YES or S407: YES), the CPU 31 waits further for a command to be received. In this regard, however, it may not be likely that the same command is received for a plurality of times. Therefore, waiting further for the same command to be received may be omitted.

In S406 or in S407, if the CPU 31 determines that the sheet size or the image orientation indicated in the received command is not the same as the default sheet size or the default image orientation (S406: NO or S407: NO), in S408, the CPU 31 executes a rotation angle determining process, which is similar to the rotation angle determining process in S402 and S106 in the PDL printing process (see also FIG. 8), with the sheet size or the image orientation indicated in the received command which is different from the default sheet size or the default image orientation. Thus, the CPU 31 may temporarily store the information concerning the default sheet size and the information concerning the default image orientation in the RAM 33 and, if a command containing the information concerning the sheet size or the image orientation is received, update the information stored in the RAM 33 with the received information and redo the rotation angle determining process with the updated information to conclusively determine the rotation angle.

In S405, if the CPU 31 determines that a start-data command is received (S405: YES), in S409, the CPU 31 determines whether the current rotation angle is zero degrees. If the CPU 31 determines that the current rotation angle is zero degrees (S409: YES), in S410, the CPU 31 rasterizes the PDL data in the rasterizer 51 in the RIP 50 without rotating the image. The action in S410 may be similar to the action in S108.

On the other hand, in S409, if the CPU 31 determines that the determined rotation angle is not zero degrees (S409: NO), in S411, the CPU 31 rasterizes the PDL data in the rasterizer 51 in the RIP 50 with image rotation. The action in S411 may be similar to the action in S109. Following S410 or S411, in S412, the CPU 31 determines whether the image in the raster data is to be printed in a high resolution. If the CPU 31 determines that the image is not to be printed in a high resolution (S412: NO), in S413, the CPU 31 samples the PDL data in the sample generator 52. The action in S413 may be similar to the action in Sill.

Following S413 or an affirmative determination in S412 that the image in the raster data is to be printed in a high resolution (S412: YES), in S414, the CPU 31 stores the generated raster data in the RAM 33. In S415, the CPU 31 converts the raster data into the CMYK format in the CMYK converter 62 in the posterior-stage image processor 60 and returns to the PDL printing process. The action in S414 may be similar to the action in S112 in the PDL printing process. The action in S415 may be similar to the action in S305 in the posterior-stage process.

As described earlier, in PCL5, information of one or both of the image orientation and the sheet size may not necessarily be given, and the CPU 31 may not be able to determine the necessity of the image rotation by the time when the rasterization starts. Therefore, when the PDL is PCL5, as long as the image orientation information and the sheet size information are contained as the print parameters, the CPU 31 may determine the necessity of the image rotation based on these print parameters. Meanwhile, if the image orientation information or the sheet size information is included as the print parameter, the CPU 31 may determine the necessity of image rotation based on the default settings. Moreover, if the image rotation is determined to be necessary, the CPU 31 may rotate and rasterize the image concurrently without lowering the quality of the image in the small-sized memory. Specifically, the necessity of image rotation may be determined in earlier timing based on the default image orientation and the default sheet size so that the rasterization may be started promptly.

Referring back to FIG. 8, the PDL printing process will be further described. following the second-format PDL process in S114 or the posterior-stage process in S113, in S115, the CPU 31 controls the printing device 10 to print the images based on the generated print data and ends the PDL printing process.

According to the printer 100 in the embodiment described above, in order to print an image requiring rotation in a high quality or in a high resolution, the image may be rasterized and rotated concurrently in the rasterizing process. Therefore, without lowering the quality of the image by sampling, print data with the rotated image may be generated. Meanwhile, when image rotation is required, but when the image does not need to be printed in a high quality or in a high resolution, the image may be sampled and rasterized, stored in the RAM 33, and rotated by the hardware-aided posterior-stage image processor 60 to accelerate the processing speed. Further, when the image requires a high quality or a high resolution, and when the data processing requires a large amount of memory, the image may be sampled and rasterized, stored in the RAM 33, and rotated by the hardware-aided posterior-stage image processor 60 so that potential inconvenience due to insufficiency of the memory amount may be restrained.

Although an example of carrying out the invention have been described, those skilled in the art will appreciate that there are numerous variations and permutations of the printing apparatus and the computer readable storage medium for the printing apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims. For example, the technics described above may not necessarily be applied to a printer but may be applied to other imaging apparatuses that may print an image, such as a copier, a multifunction peripheral machine, and a facsimile machine. For another example, the printing apparatus may be equipped with an image reading device, and image data to be processed by the printing apparatus may not necessarily be received from an external device but may be generated by the image reading device reading an image.

For another example, the processes described above may not necessarily be executed by the printer 100, but some of the processes to generate the print data may be taken over by an apparatus different from the printer 100. For example, a system having a print-data generating server and a printer 100 may be provided, and the server may generate the print data. In other words, the server may receive the PDL data, generate the print data, and transmit the generated print data to the printer 100, and the printer 100 may print images based on the received print data.

For another example, determination concerning sufficiency or insufficiency of the memory amount required for generating the print data may not necessarily be made based on the predetermined conditions described above (e.g., a resolution higher than a predetermined level, a high resolution setting, and/or a high quality setting) but may be made based on other condition(s). For example, if an amount of unoccupied memory is larger than or equal to a predetermined amount, the image in the raster data may be rotated by the image rotator 61 in the posterior-stage image processor 60, and when the amount of unoccupied memory is smaller than the predetermined amount, the image may be rotated and rasterized concurrently by the rasterizer 51 in the RIP 50.

For another example, the rotation angle determining process may not necessarily be executed after the begin-page command is received in the PDL printing process but may be executed before the begin-page command is received once the sheet size information and the image orientation information are both obtained.

For another example, the rotation angle determining process may not necessarily be executed in the second-format PDL process based on the determination that the sheet size or the image orientation indicated in the received commands is different from the default sheet size or the default image orientation but may be executed even when the sheet size or the image orientation indicated in the received command is the same as the default sheet size or the default image orientation. In particular, the steps S406 or S407 in the second-format PDL process may be omitted, and the flow may proceed to S408 based on an affirmative determination in S403 or S404.

For another example, even when the PDL is PCL5 (S101: YES), the determination whether the rasterization with or without rotation should be executed may be made based on the predetermined condition. In particular, in S409, if the CPU 31 determines that the rotation angle is not zero degrees (S409: NO), the CPU 31 may determine whether the predetermined condition is satisfied, and if the predetermined condition is satisfied, the CPU 31 may proceed to S411. If the predetermined condition is not satisfied, for example, the CPU 31 may proceed to a flow similar to S113 in the PDL printing process.

Moreover, the steps in the flowcharts described above may not necessarily be processed in the fixed order as described above but may be processed in a different order or partly in parallel unless the alteration causes contradiction in the processes.

Moreover, the steps or the processes in the flowcharts described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A printing apparatus, comprising:
   a printing device;
   a communication interface;
   a memory; and
   a controller configured to execute:
      a receiving process, in which the controller receives image data described in a page description language through the communication interface;
      a rasterizing process, in which the controller rasterizes the image data and stores raster data being the rasterized image data in the memory;
      a generating process, in which the controller generates print data from the raster data stored in the memory to cause the printing device to print a printing image on a sheet based on the printing data;
      a condition determining process, in which the controller determines whether a predetermined condition is satisfied, the predetermined condition indicating that a quality of printing the printing image based on the print data is set at a predetermined level or higher; and
      a rotation determining process, in which the controller determines whether an image in the image data is to be rotated,
   wherein, in a case where the controller determines in the rotation determining process that the image in the image data is to be rotated and in the condition determining process that the predetermined condition is satisfied, the controller in the rasterizing process conducts rotation of the image in the image data concurrently with rasterization of the image data and stores the raster data including the rotated image in the memory; and
   wherein, in a case where the controller determines in the rotation determining process that the image in the image data is to be rotated and in the condition determining process that the predetermined condition is not satisfied, the controller in the rasterizing process conducts rasterization of the image data without rotating the image in the image data, and in the generating process rotates a raster image in the raster data stored in the memory and generates the print data from the raster data including the rotated raster image.

2. The printing apparatus according to claim 1, wherein the predetermined condition includes a condition such that a resolution of the image set as a parameter in the received image data exceeds a predetermined level.

3. The printing apparatus according to claim 1, wherein the predetermined condition includes a condition such that a parameter indicating a high quality is set in one of the printing apparatus and the received image data.

4. The printing apparatus according to claim 1, wherein the predetermined condition includes a condition such that a memory amount required to generate the print data from the image data is smaller than or equal to a predetermined amount;
   wherein, in the case where the controller determines in the rotation determining process that the image in the image data is to be rotated and in the condition determining process that the predetermined condition is not satisfied, the controller in the rasterizing process conducts the rasterization of the image data without rotating the image, lowers a resolution of the raster data, and stores the raster data in the memory, and in the generating process rotates the raster image in the raster data stored in the memory and generates the print data from the raster data including the rotated raster image.

5. The printing apparatus according to claim 1, wherein the page description language to describe the image data received in the receiving process is in one of formats including:
   a first format, in which first orientation information indicating an orientation of the image and first size information indicating a sheet size are described prior to a command for starting the rasterizing process; and
   a second format, in which second orientation information indicating an orientation of the image and second size information indicating a sheet size are described prior to a command for starting the rasterizing process, at least one of the second orientation information and the second size information being omittable;
   wherein a default image orientation and a default sheet size are set in the printing apparatus,
   wherein the controller is configured to:
      execute a format determining process, in which the controller determines a format of the page description language describing the image data received in the receiving process between the first format and the second format;
   wherein, in a case where the controller determines in the format determining process that the format of the page description language is the second format, and in a case where the second orientation information and the second size information are described prior to the command for starting the rasterizing process, the controller in the rotation determining process determines whether the image in the image data is to be rotated based on the second orientation information and the second size information, but in a case where at least one of the second orientation information and the second size information is omitted, the controller in the rotation determining process determines whether the image in the image data is to be rotated by use of at least one of the default orientation information and the default size information; and
   wherein, in a case where the controller determines in the rotation determining process that the image in the image data is to be rotated, the controller in the rasterizing process conducts the rotation of the image in the image data concurrently with the rasterization of the image data and stores the raster data including the rotated image in the memory.

6. The printing apparatus according to claim 5,
wherein, in the case where the controller determines in the format determining process that the format of the page description language is the second format, the controller makes a provisional determination whether the image in the image data is to be rotated by use of the default image orientation and the default sheet size, and in the case where the second orientation information and the second size information are described prior to the command for starting the rasterizing process, the controller in the rotation determining process determines whether the image in the image data is to be rotated based on the second orientation information and the second size information to make a conclusive determination over the previously made provisional determination, but in a case where the command for starting the rasterizing process is described prior to description of at least one of the second orientation information and the second size information, the controller in the rotation determining process makes a conclusive determination that the image in the image data is to be rotated by use of the at least one of the default image orientation and the default sheet size.

7. The printing apparatus according to claim 1,
wherein the controller is configured to determine in the rotation determining process whether the image in the image data is to be rotated based on a combination of an orientation of a sheet set in the printing apparatus and an orientation of the image set in the received image data.

8. The printing apparatus according to claim 1,
wherein the controller is configured to determine in the rotation determining process whether the image in the received image data is to be rotated based on a combination of a printing side, an orientation of a binding edge, and an orientation of the sheet to be used in double-sided printing set in the received image data.

9. A non-transitory computer readable storage medium storing a set of program instructions for an information processing apparatus comprising a processor, a communication interface, and a memory, the set of program instructions, when executed by the processor, causing the information processing apparatus to:
  receive image data described in a page description language through the communication interface;
  rasterize the image data and store raster data being the rasterized image data in the memory;
  generate print data from the raster data stored in the memory to cause the printing device to print a printing image on a sheet based on the printing data,
  determine whether a predetermined condition is satisfied, the predetermined condition indicating that a quality of printing the printing image based on the print data is set at a predetermined level or higher; and
  determine whether the image in an image data is to be rotated,
  wherein, in a case where processor determines that the image in the image data is to be rotated and that the predetermined condition is satisfied, the processor conducts rotation of the image in the image data concurrently with rasterization of the image data and stores the raster data including the rotated image in the memory; and
  wherein, in a case where the processor determines that the image in the image data is to be rotated and that the predetermined condition is not satisfied, the processor conducts rasterization of the image data without rotating the image in the image data, and rotates a raster image in the raster data stored in the memory and generates the print data from the raster data including the rotated raster image.

\* \* \* \* \*